(12) United States Patent
Boyarski et al.

(10) Patent No.: US 8,393,432 B2
(45) Date of Patent: Mar. 12, 2013

(54) VEHICLE SEAT SWITCH ACTUATOR

(75) Inventors: Jesse C. Boyarski, Richland Center, WI (US); Cody M. Sweet, Baraboo, WI (US)

(73) Assignee: Seats, Inc., Reedsburg, WI (US)

( * ) Notice: Subject to any disclaimer, the term of this patent is extended or adjusted under 35 U.S.C. 154(b) by 129 days.

(21) Appl. No.: 13/051,056

(22) Filed: Mar. 18, 2011

(65) Prior Publication Data
US 2012/0234620 A1 Sep. 20, 2012

(51) Int. Cl.
*B60K 28/04* (2006.01)
(52) U.S. Cl. .... 180/273; 200/85 A; 340/667; 297/217.3; 307/10.6
(58) Field of Classification Search ......... 180/273; 200/85 A, 85 R; 297/217.1, 217.2, 217.3; 340/667; 307/10.1, 10.6; 177/136, 144
See application file for complete search history.

(56) References Cited

U.S. PATENT DOCUMENTS

| | | | |
|---|---|---|---|
| 2,572,521 A * | 10/1951 | Rogers | 340/525 |
| 2,794,089 A * | 5/1957 | Hogg et al. | 200/85 R |
| 3,437,993 A | 4/1969 | Recio et al. | |
| 3,487,451 A | 12/1969 | Fontaine | |
| 3,500,946 A | 3/1970 | Boyajian | |
| 3,569,726 A | 3/1971 | Reid et al. | |
| 3,703,618 A | 11/1972 | Lewis | |
| 3,704,352 A | 11/1972 | Fontaine | |
| 3,749,866 A | 7/1973 | Tiazkun et al. | |
| 3,860,773 A | 1/1975 | Fontaine | |
| 3,946,178 A | 3/1976 | Eberle et al. | |
| 4,075,443 A | 2/1978 | Fatur | |
| 4,361,741 A | 11/1982 | Leskoverc et al. | |
| 4,385,863 A | 5/1983 | Minor | |
| 4,572,319 A | 2/1986 | Fontaine | |
| 4,678,058 A | 7/1987 | Wooters | |
| 4,795,865 A | 1/1989 | Howard | |
| 5,120,980 A | 6/1992 | Fontaine | |
| 5,124,512 A | 6/1992 | Huettner et al. | |
| 5,162,626 A * | 11/1992 | Hutchison et al. | 200/85 A |
| 5,424,502 A * | 6/1995 | Williams | 200/85 A |

(Continued)

FOREIGN PATENT DOCUMENTS

JP 02-51714 A * 2/1990

OTHER PUBLICATIONS

Cherry Corporation, Miniature Snap-Action Switches, publicly available to Dec. 2, 2004.

(Continued)

*Primary Examiner* — Ruth Ilan
(74) *Attorney, Agent, or Firm* — Michael Best & Friedrich LLP

(57) ABSTRACT

A seat has a seat frame and a seat cushion supported by the seat frame. The seat cushion has an upper surface that supports a user and a lower surface defining a cavity. The seat cushion moves between an at rest condition in which no operator is seated on the seat, and a deflected condition in which the seat cushion is deflected with respect to the frame in response to an operator seated on the seat. A switch is mounted to the frame and opens and closes an electrical circuit in response to an actuating force. A switch actuator is mounted to the seat cushion lower surface in the cavity and moves between a non-actuating position when the seat is at rest and an actuating position when the seat is deflected. The switch actuator delivers the actuating force as the switch actuator is moved toward the actuating position.

20 Claims, 15 Drawing Sheets

U.S. PATENT DOCUMENTS

| | | | |
|---|---|---|---|
| 5,473,313 A | 12/1995 | Graebe, Jr. | |
| 6,152,534 A | 11/2000 | Maeda et al. | |
| 6,359,245 B1 * | 3/2002 | Wahls | 200/52 R |
| 6,361,117 B1 | 3/2002 | Tate | |
| 6,729,691 B2 | 5/2004 | Koepke et al. | |
| 6,879,261 B2 | 4/2005 | Nishino et al. | |
| 7,144,025 B2 | 12/2006 | Wakita et al. | |
| 7,162,344 B2 | 1/2007 | Kojima et al. | |
| 7,211,753 B2 * | 5/2007 | Brodersen | 200/85 A |
| 7,395,895 B2 | 7/2008 | Tate et al. | |
| 7,396,077 B2 | 7/2008 | Boulva | |
| 7,726,432 B2 | 6/2010 | Nemec et al. | |
| 2009/0000846 A1 * | 1/2009 | Nemec et al. | 180/273 |

OTHER PUBLICATIONS

Cherry Corporation, Webpage, E Series Miniature Snap-Action Switches, available online at <http://www.cherrycorp.com/english/switches/miniature/e21.htm>, publicly available prior to Dec. 2, 2004.

Cherry Corporation, Webpage, Miniature E Series, available online at: <http://www.cherrycorp.com/english/switches/pdf/E21_Series.pdf>, publicly available prior to Dec. 2, 2004.

* cited by examiner

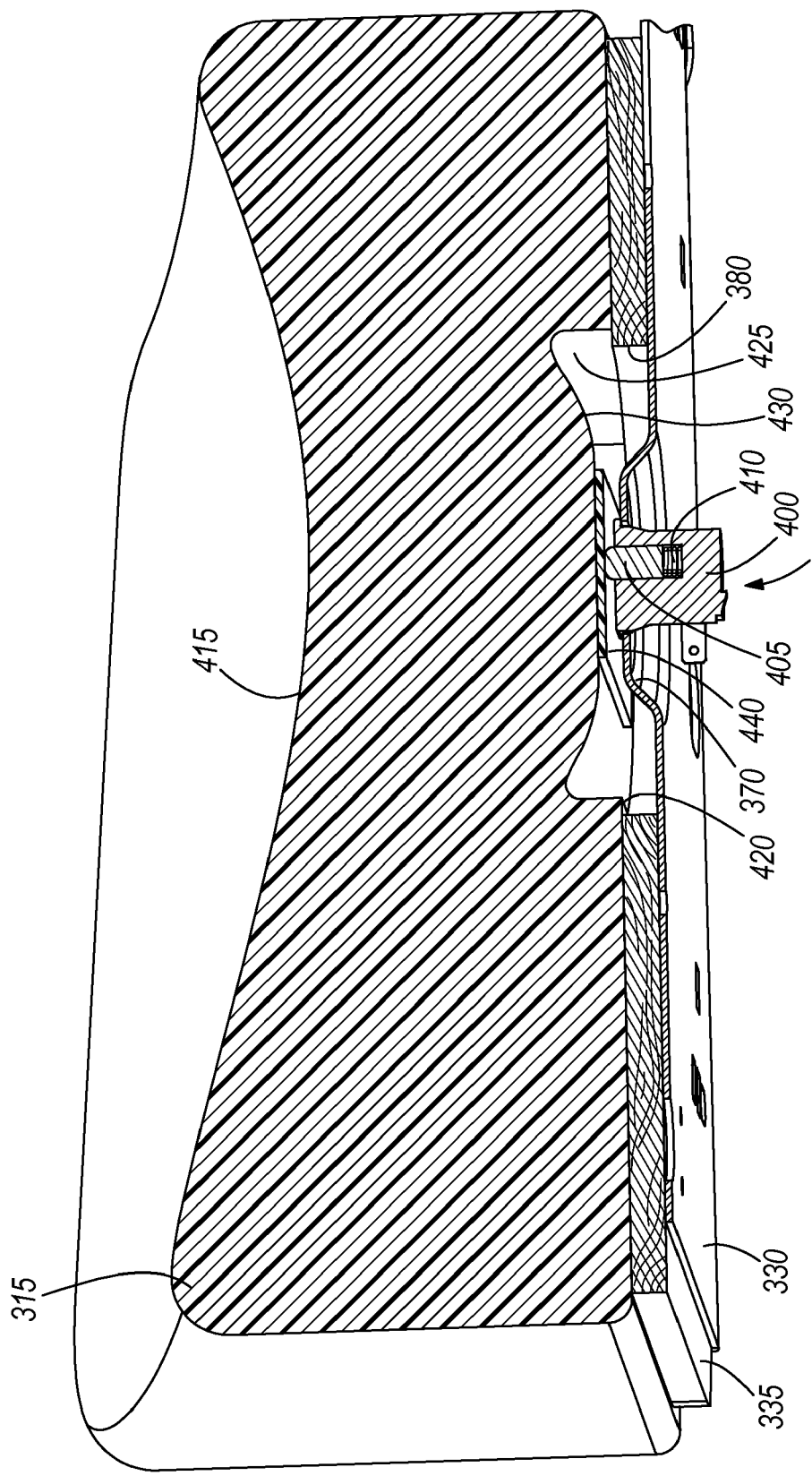

US 8,393,432 B2

VEHICLE SEAT SWITCH ACTUATOR

BACKGROUND

The present invention relates to a seat assembly that includes an ignition switch and an actuator for actuating the switch.

SUMMARY

In one embodiment, the invention provides a seat having a seat frame and a seat cushion supported by the seat frame. The seat cushion has an upper surface configured to support a user and a lower surface, opposite the upper surface. The lower surface defines a cavity. The seat cushion moves between an at rest condition in which no operator is seated on the seat, and a deflected condition in which the seat cushion is deflected with respect to the frame in response to an operator seated on the seat. A switch is mounted to the frame and has first and second parts movable with respect to each other to open and close an electrical circuit in response to an actuating force. A switch actuator is mounted to the seat cushion lower surface in the cavity and moves between a non-actuating position when the seat is in the at rest condition and an actuating position when the seat is in the deflected condition. The switch actuator delivers the actuating force as the switch actuator is moved toward the actuating position.

In another embodiment the invention provides an off-highway vehicle including a chassis, a wheel supporting the chassis, a prime mover mounted to the chassis, a transmission for driving the wheel in response to the operation of the prime mover, a seat frame, and a seat cushion supported by the seat frame. The seat cushion has an upper surface configured to support a user and a lower surface, opposite the upper surface, the lower surface defines a cavity. The seat cushion moves between an at rest condition in which no operator is seated on the seat, and a deflected condition in which the seat cushion is deflected with respect to the frame in response to an operator seated on the seat. A switch is mounted to the frame, and the switch has first and second parts movable with respect to each other to open and close an electrical circuit in response to an actuating force. A switch actuator is mounted to the seat cushion lower surface in the cavity and moves between a non-actuating position when the seat is in the at rest condition and an actuating position when the seat is in the deflected condition. The switch actuator delivers the actuating force as the switch actuator is moved toward the actuating position.

Other aspects of the invention will become apparent by consideration of the detailed description and accompanying drawings.

BRIEF DESCRIPTION OF THE DRAWINGS

FIG. 15 is the same view as FIG. 14 but showing the seat in a bottomed-out deflected condition.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
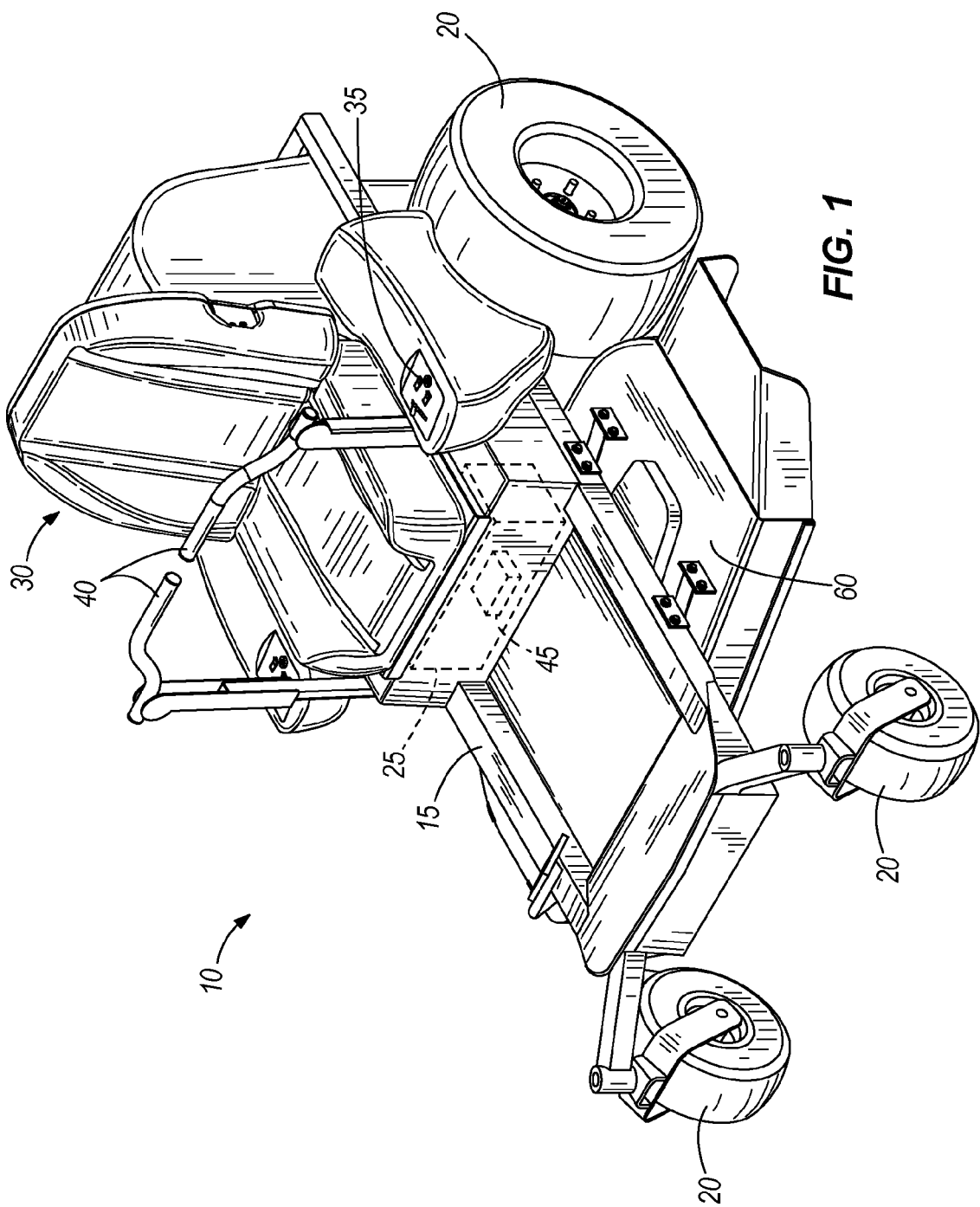
FIG. 1 is a perspective view of an off-highway vehicle including a seat assembly according to the present invention.

FIG. 1 illustrates an off-highway vehicle 10 that includes a chassis 15, wheels 20 supporting the chassis 15, an internal combustion engine 25 mounted to the chassis 15, and a seat 30 mounted to the chassis 15. An operator zone of the vehicle 10 includes the seat 30, a control panel 35 within reach of an operator seated in the seat 30, and control levers 40 within reach of an operator seated in the seat 30. One suitable off-highway vehicle is commonly referred to as a zero-turn radius lawn mower, but the invention may be embodied in other types of off-highway vehicles and other vehicles intended for road use; the invention is not limited to the application illustrated.

In the illustrated embodiment, the engine 25 includes an ignition system 45 that provides a spark or other event that drives combustion within the internal combustion engine 25. Although the engine 25 in the illustrated embodiment is of the internal combustion variety, the invention is applicable to any type of engine, and the term "ignition system," as applied to this invention, refers to the part of the engine that sustains its continued operation. In this regard, the ignition system 45 may be termed an ignition circuit that permits operation of the engine 25 when closed and disables operation of the engine 25 when open. Although the illustrated embodiment includes an internal combustion engine 25, the present invention may be applied to vehicles and systems having alternative prime movers, such as batteries or other energy storage devices, fuel cells, or gas/electric hybrid drive systems. In such other embodiments, the ignition system would include the electric circuit that enables and disables the prime mover to operate or that enables and disables the vehicle drive and implement systems to operate under the influence of the prime mover.

In the illustrated embodiment, the engine 25 drives rotation of at least one of the wheels 20 through a transmission (e.g., a hydraulic, electric, or mechanical transmission). The operator independently controls speed and direction of rotation of the left and right side wheels 20 via the control levers 40. In some embodiments, the engine 25 also selectively drives rotation of one or more cutting blades under a mower deck 60 to cut vegetation over which the vehicle 10 travels.

Figure 2:
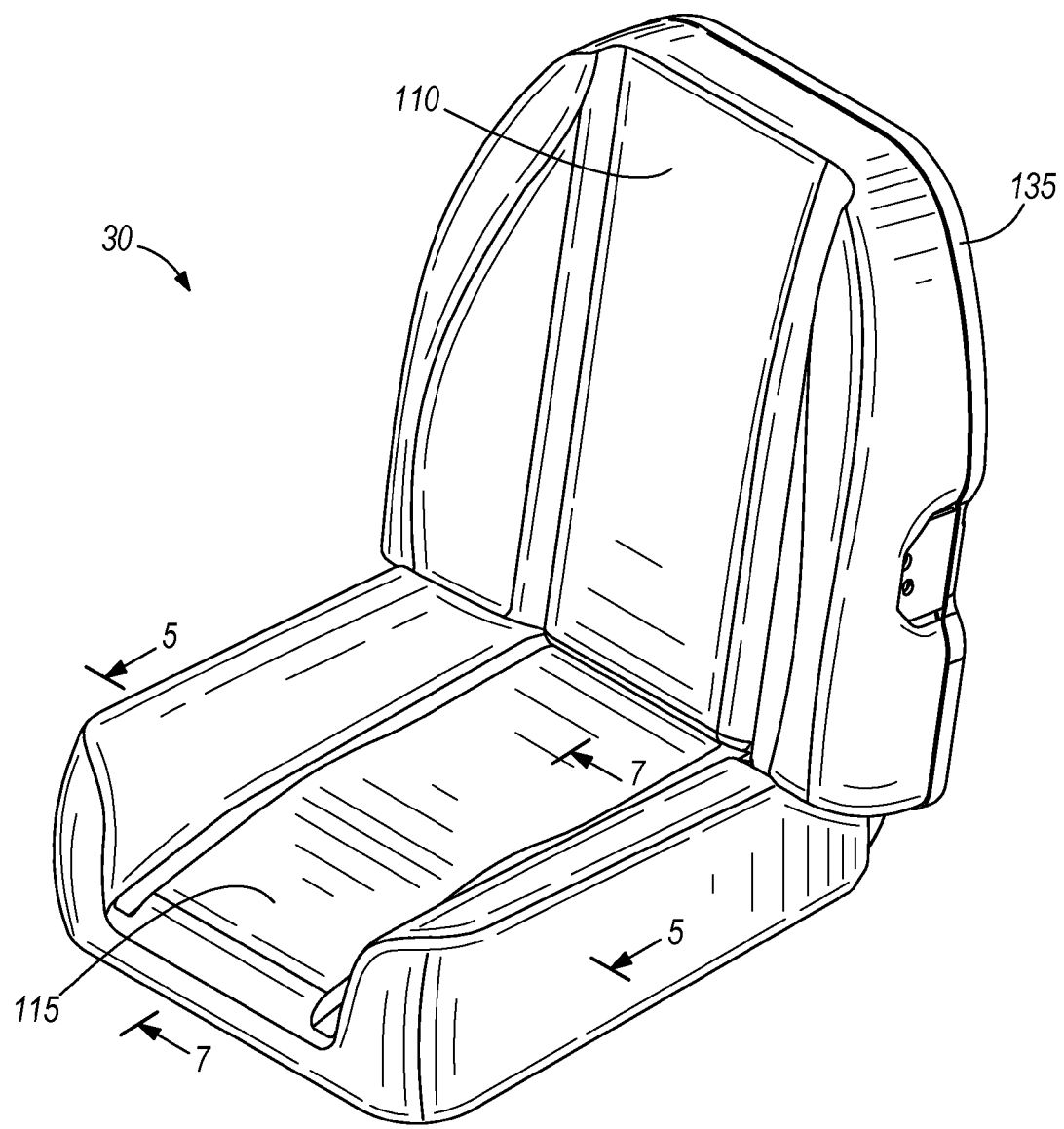
FIG. 2 is a top perspective view of the seat assembly.
Figure 3:
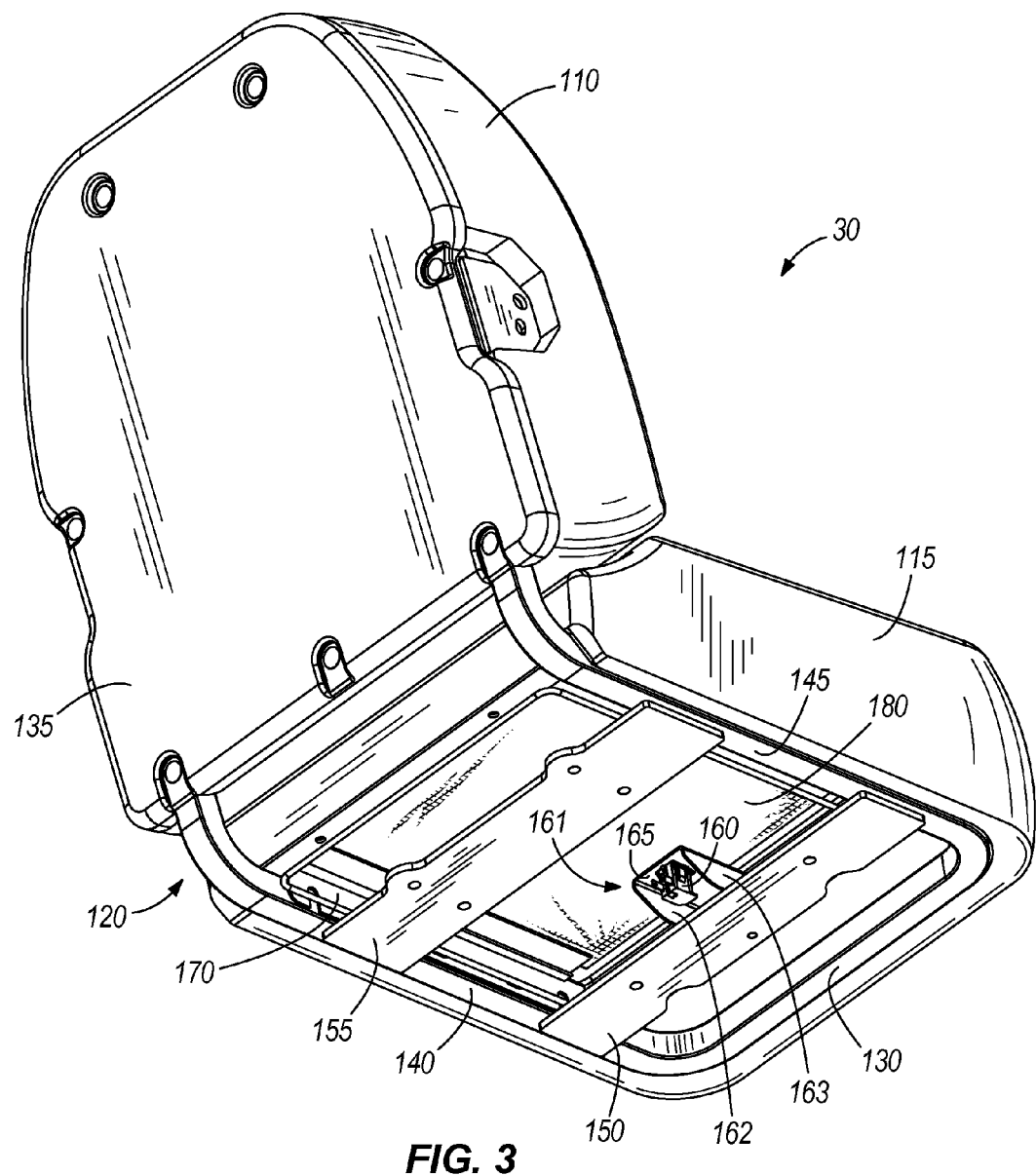
FIG. 3 is a bottom perspective view of the seat assembly.

With reference to FIGS. 2 and 3, the seat 30 includes back and bottom cushions 110, 115, respectively, to accommodate an operator of the vehicle 10. The seat 30 includes a seat frame 120 that includes a front portion 130, a rear portion 135 and left and right side portions 140, 145, respectively, extending between the front and rear portions 130 and 135. The terms "front," "rear," "left," and "right" refer to the perspective of an operator seated in the seat 30 for normal use. A "front portion" of the seat 30 is that portion proximate the legs of an operator seated in the seat 30. The "front portion" is closer to the front portion 130 of the frame 120 than to the rear portion 135, and a "rear portion" of the seat 30 is that portion closer to the rear portion 135 of the frame 120 than to the front portion 130.

Figure 4:
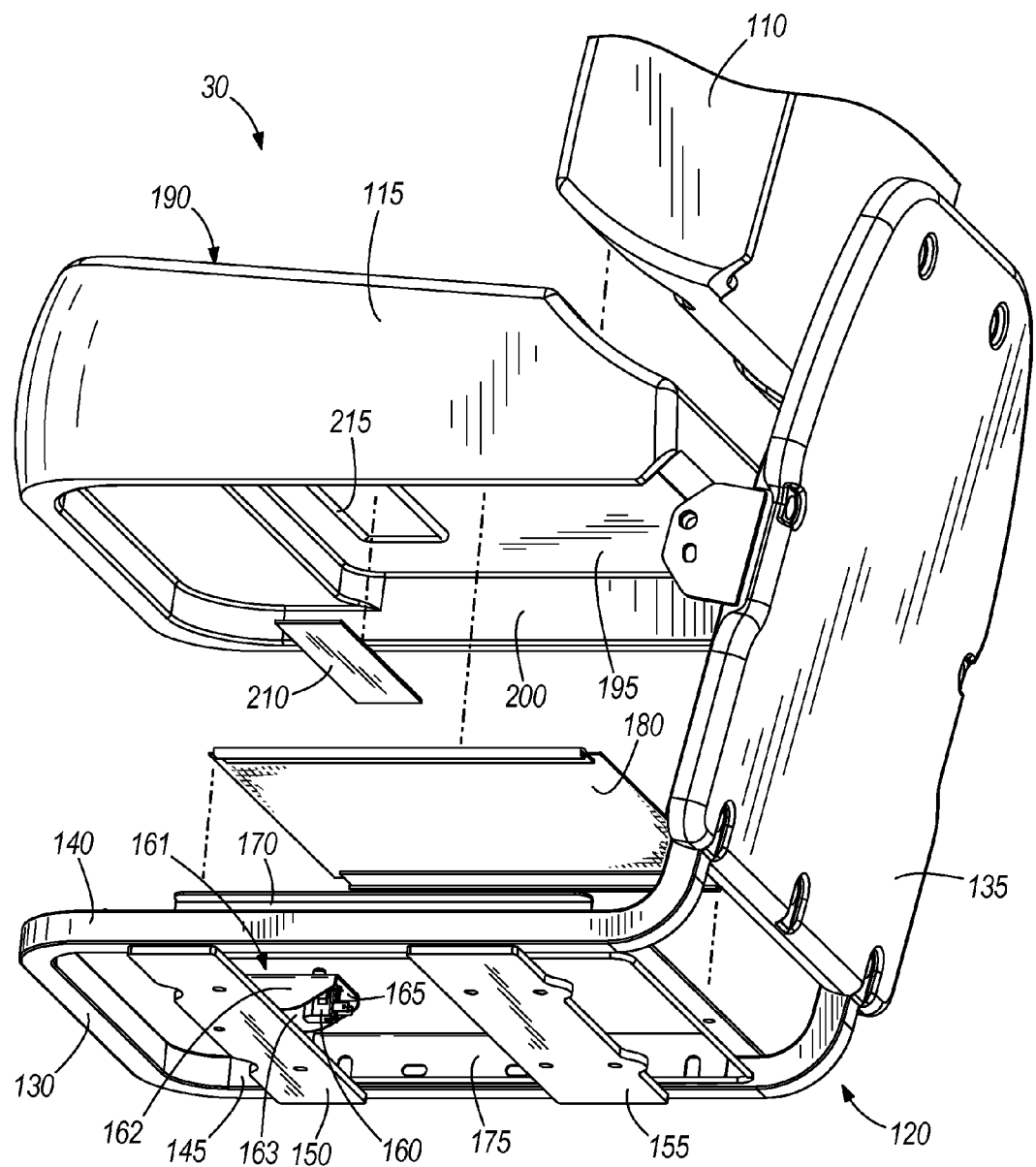
FIG. 4 is an exploded view of the seat assembly.

With reference to FIGS. 3 and 4, first and second support brackets 150, 155 extend between the side portions 140, 145. A switch 160 is mounted to the first support bracket 150 via a mounting bracket 161 defining first and second downwardly depending wings 162, 163 and an outwardly extending flange 165 defining an aperture 167 therein. The mounting bracket 161 is coupled to the first support bracket 150 by any suitable fastening means, such as by welding. The switch 160 is inserted into the aperture 167 includes at least one tab that creates a snap fit to retain the switch 160 within the aperture 167. In another embodiment, the switch 160 is mounted directly to the first support bracket 150. In a further embodiment, the switch 160 is mounted either directly or indirectly to the second support bracket 155.

The side portions 140, 145 include support brackets 170, 175 to which are mounted a resilient web 180, such that the web 180 extends across the seat frame 120 between the left and right side portions 140, 145. The illustrated web 180 is made of a flexible, strong, resilient material. One suitable material for use in the web 180 is sold under the Dymetrol trademark of E. I. Du Pont De Nemours and Company. In another embodiment, a rubberized or plastic material is sprayed, painted, or otherwise coupled to the foam to form a flexible, strong, resilient membrane. A top surface of the web 180 supports the bottom cushion 115 of the seat 30, and a bottom surface of the web 180 faces down away from the bottom cushion 115.

With reference to FIGS. 4-8, the bottom cushion 115 has an upper surface 190 configured to support a user and a lower surface 195 opposite the upper surface 190. The lower surface 195 defines a cavity 200. In the illustrated embodiment, the cavity 200 receives the web 180, but in other embodiments, the web 180 and the cavity 200 are different shapes and/or sizes.

A switch actuator 210 is coupled to the lower surface 195 of the bottom cushion 115 in the cavity 200. The illustrated switch actuator 210 is a substantially rectangular plate, but other shapes are possible. The switch actuator 210 is made of a flexible and resilient material that is relatively hard compared to the cushion material, such as a high density polyethylene, a piece of re-bond foam, or other material. Re-bond foam comprises bits and pieces of recycled foam bonded together with an adhesive. The switch actuator 210 can be coupled to the bottom cushion 115 by any suitable fastener or method. The illustrated switch actuator 210 is coupled directly to the bottom cushion 115 by adhesive. In the illustrated embodiment, the switch actuator 210 is mounted to lower surface 195 of the bottom cushion 115 in a substantially central location. Other positions of the switch actuator 210 and the cavity 200 on the bottom cushion 115 are possible; the invention is not limited to the specific illustrated embodiment.

A rib 215 protrudes from lower surface 195 of the bottom cushion 115 in the cavity 200. The rib 215 extends around a perimeter of the switch actuator 210. The rib 215 inhibits movement of the switch actuator 210 along the cavity 200. In some embodiments, the rib 215 overlays at least one edge or a portion of one or more edges to couple the switch actuator 210 to the lower surface 195 of the bottom cushion 115. The rib 215 also aids in proper placement of the switch actuator 210 on the lower surface 195 of the bottom cushion 115 during installation. Some embodiments include a rib extending around a portion of the perimeter of the switch actuator 210 and other embodiments omit the rib entirely.

As shown in FIGS. 5-8, the switch 160 includes a first switch portion 220 rigidly mounted to the first support bracket 150 via the mounting bracket 161, and a second switch portion 225 moveable with respect to the first switch portion 220. The switch 160 also includes a biasing member, such as the illustrated spring 230, which biases the first and second switch portions 220, 225 apart along an axis with a biasing force. The switch 160 may be termed a linear actuated switch.

Figure 5:
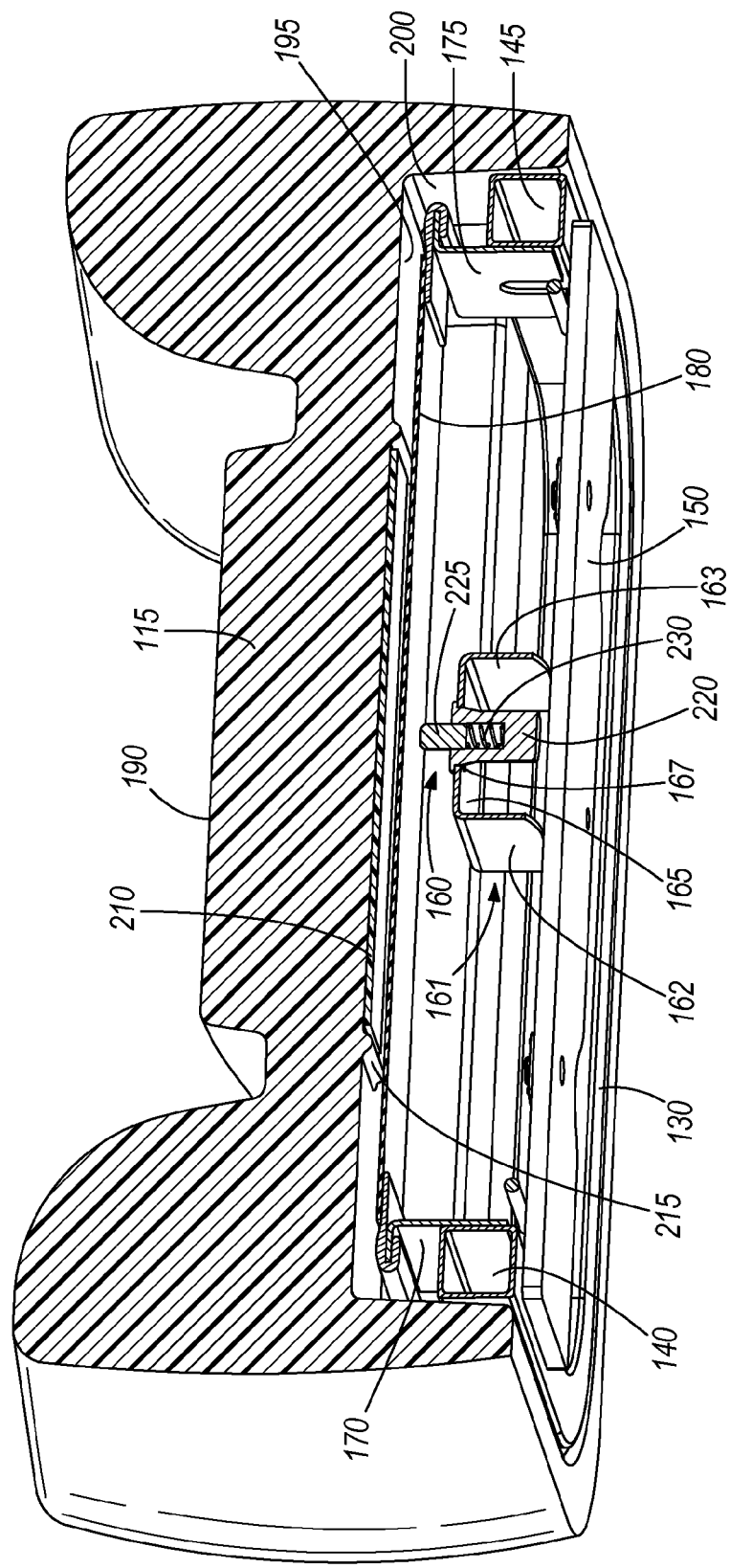
FIG. 5 is a cross-section view taken along line 5-5 of FIG. 2 showing the seat in an at-rest condition.
Figure 6:
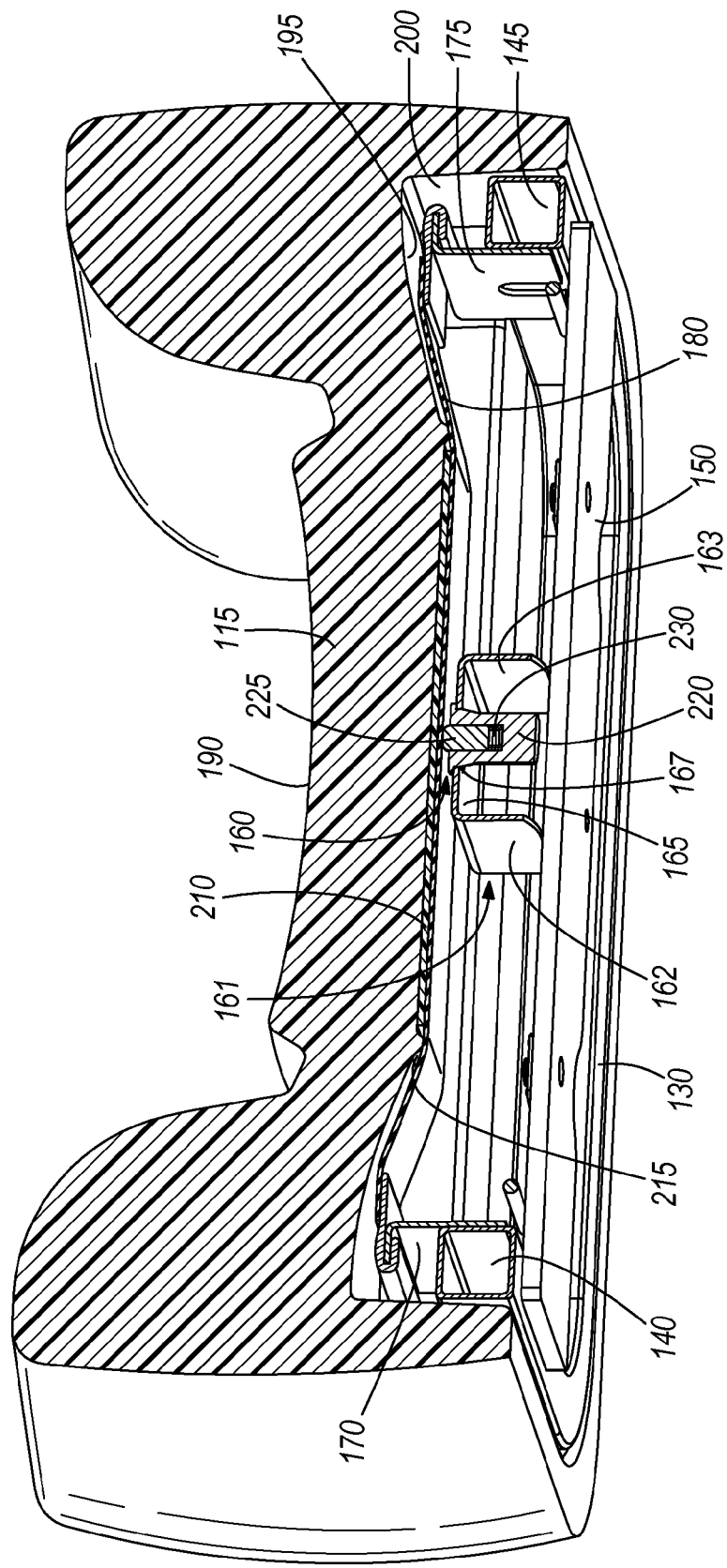
FIG. 6 is the same view as FIG. 5 but showing the seat in a bottomed-out deflected condition.
Figure 7:
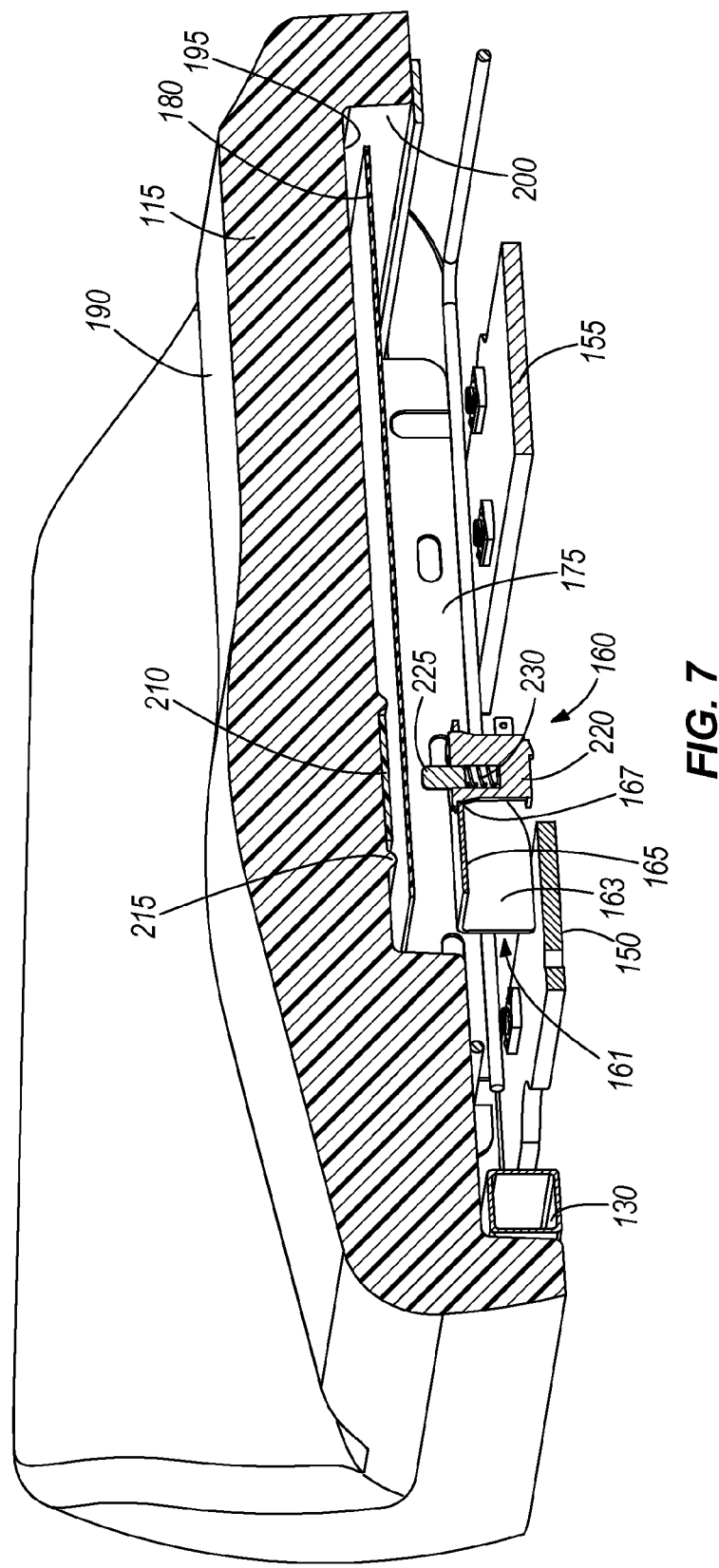
FIG. 7 is a cross-section view taken along line 7-7 of FIG. 2 showing the seat in an at-rest condition.
Figure 8:
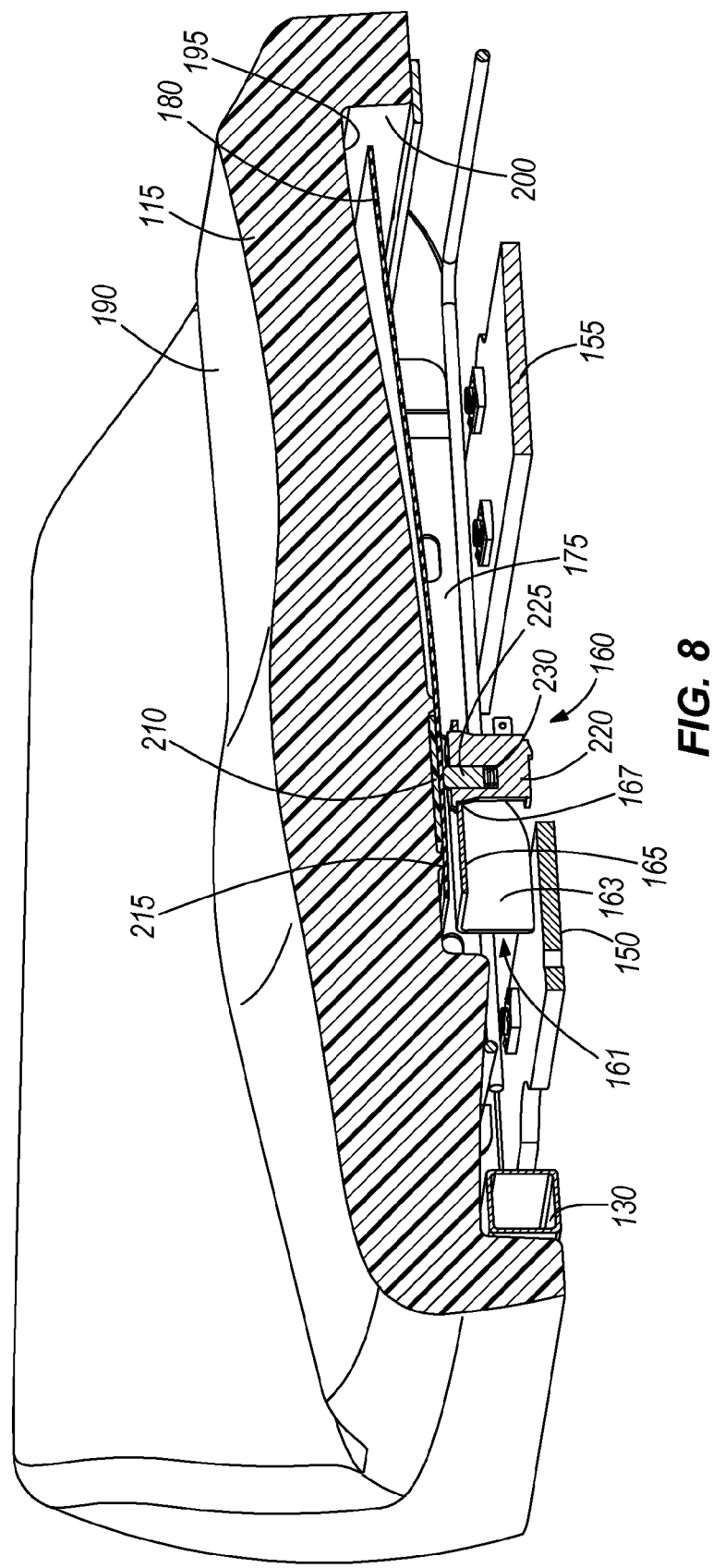
FIG. 8 is the same view as FIG. 7 but showing the seat in a bottomed-out deflected condition.

When the seat 30 is in an at rest condition, as shown in FIGS. 5 and 7, the switch actuator 210 is in a non-actuating position; when the seat 30 is in a deflected condition, as shown in FIGS. 6 and 8, the switch actuator 210 is in an actuating position. When the seat 30 is in the at rest condition, the switch actuator 210 is over the second portion 225 of the switch 160. The web 180 and the switch actuator 210 may be spaced from the second portion 225 (as illustrated in FIGS. 5 and 7) or contact the second portion 225, provided there is insufficient force applied to the second portion 225 to actuate the switch 160 due to the web 180 resting on the second portion 225.

FIGS. 6 and 8 illustrate the seat 30 in the deflected condition, due to the presence of an operation upon the seat 30. The bottom cushion 115 deflects, which moves the switch actuator 210 and the web 180 downward toward the switch 160. The switch actuator 210 presses the web 180 against the second portion 225 of the switch 160 to depress the second portion 225 of the switch 160 against the biasing force of the spring 230. When the seat 30 is in the deflected condition and the switch actuator 210 is in the actuating position, the ignition system 45 is permitted to operate.

When the operator gets out of the seat 30, the bottom cushion 115 returns to the at rest condition, such that the spring 230 is permitted to bias the second portion 225 of the switch 160 away from the first portion 220. This inhibits and/or prevents the ignition system 45 from operating. In another embodiment, the switch 160 is flipped around, such that the web 180 and the switch actuator 210 press against the first portion 220 of the switch 160.

Figure 9:
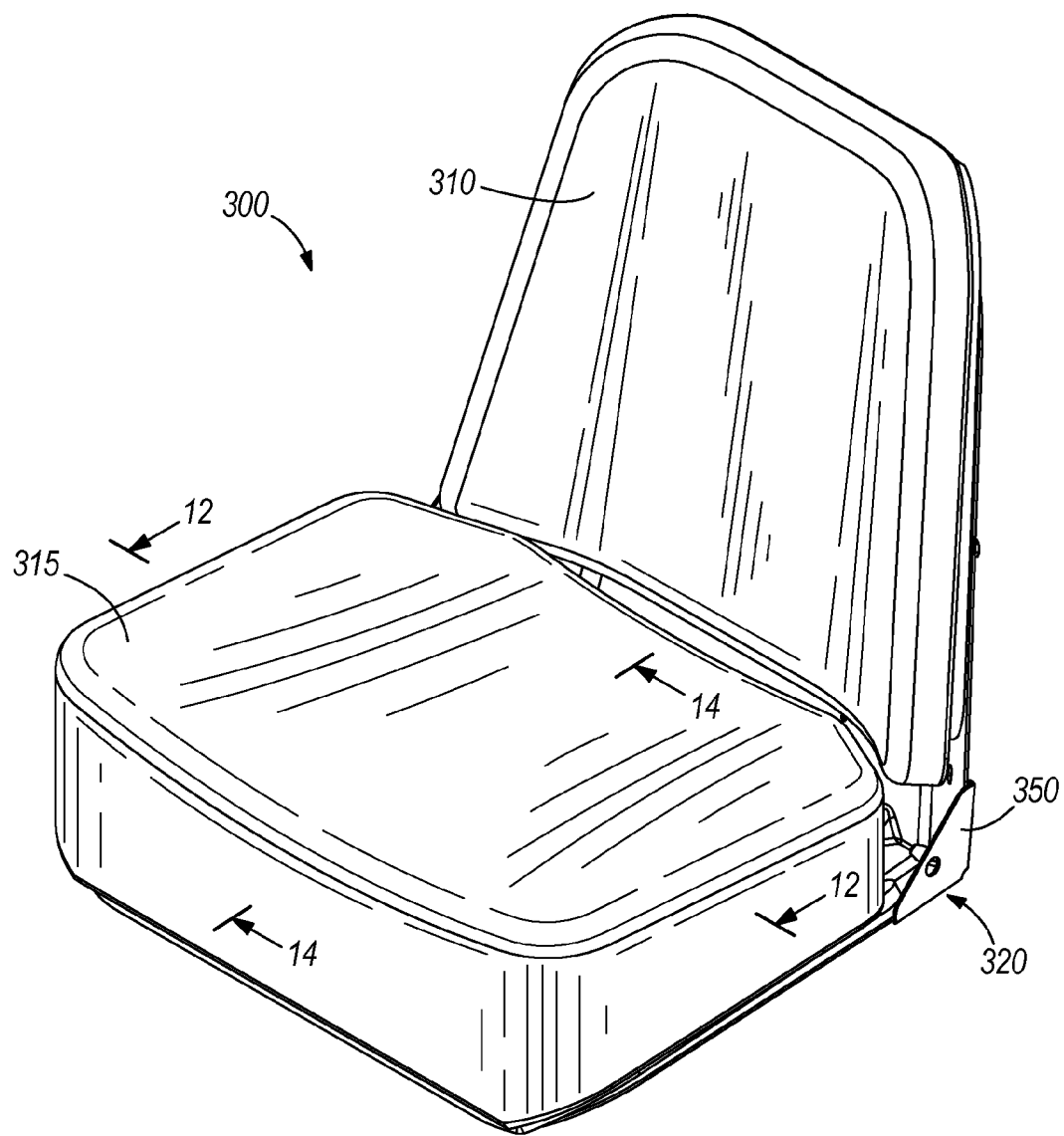
FIG. 9 is a top perspective view of a seat assembly according to another embodiment of the present invention.
Figure 10:
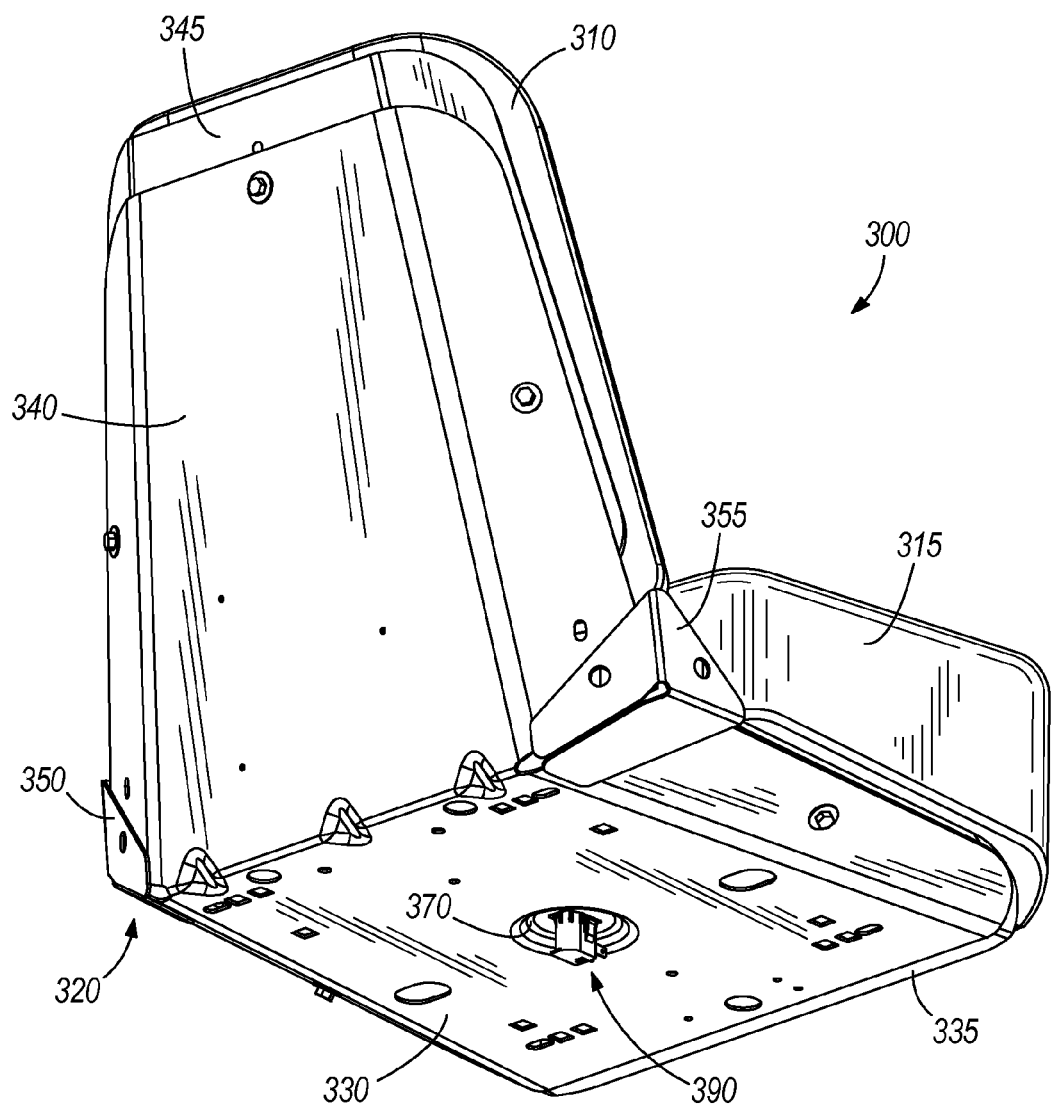
FIG. 10 is a bottom perspective view of the seat assembly of FIG. 9.
Figure 11:
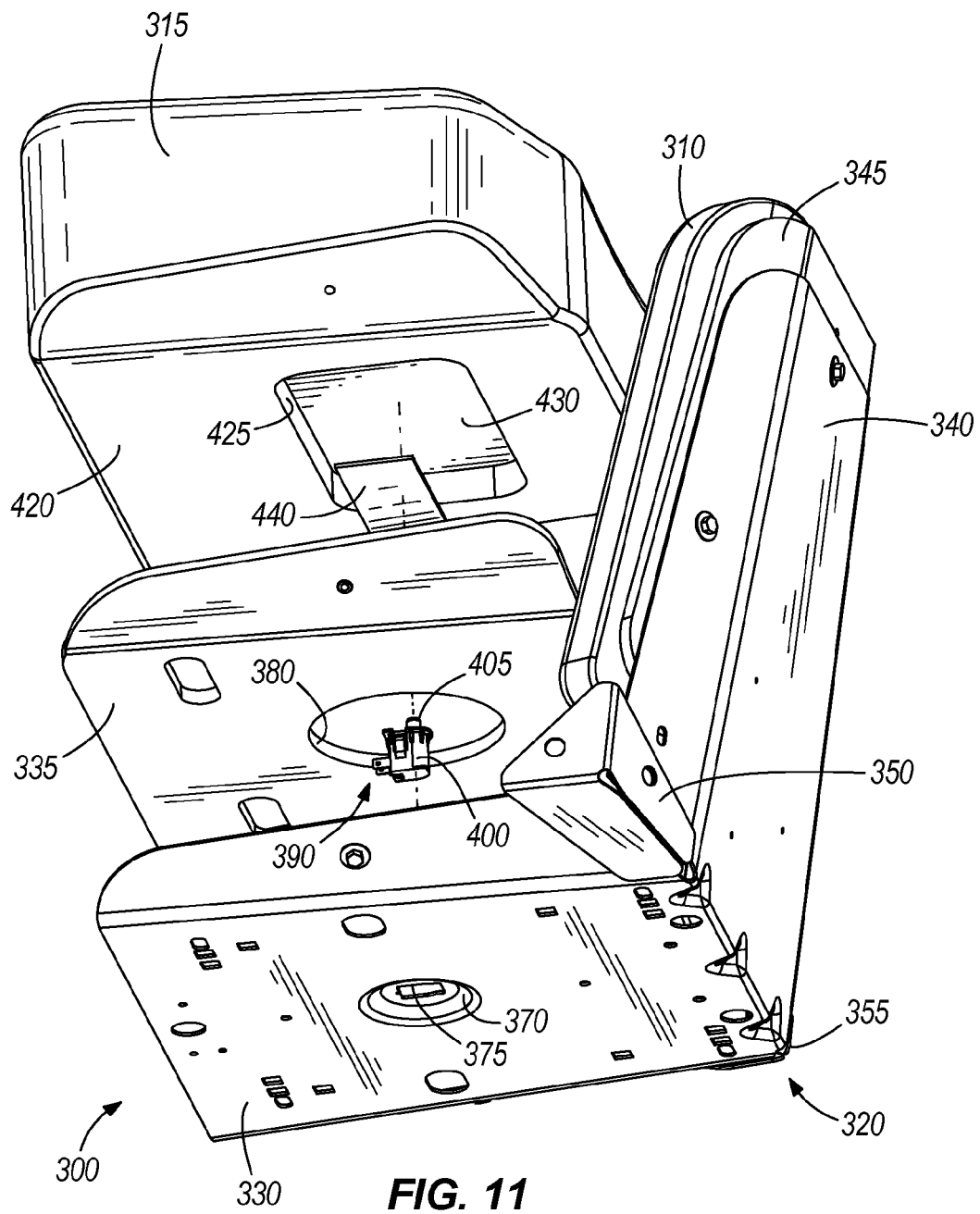
FIG. 11 is an exploded view of the seat assembly of FIGS. 9 and 10.

Another embodiment of a seat 300 suitable for use with the vehicle 10 of FIG. 1 is illustrated in FIGS. 9-15. With reference to FIGS. 9-11, the seat 300 includes back and bottom cushions 310, 315, respectively. The seat 300 includes a seat frame 320 that includes a first bottom portion 330, a second bottom portion 335, a first back portion 340 and a second back portion 345, along with first and second reinforcing gusset portions 350, 355. The back cushion 310 is coupled to the second back portion 345 by any suitable fastener, such as adhesive. The second back portion 345 is coupled to the first back portion 340 by any suitable fastener, such as nuts and bolts. The bottom cushion 315 is coupled to the second bottom portion 335 by any suitable fastener, such as adhesive. The second bottom portion 335 is coupled to the first bottom portion 330 by any suitable fastener, such as nuts and bolts. The first and second reinforcing gusset portions 350, 355 are coupled to both the first back portion 340 and the first bottom portion 330 by any suitable fastener, such as by welding.

In the illustrated embodiment, the first bottom portion 330, the first back portion 340 and the first and second reinforcing gusset portions 350, 355 are metallic. In the illustrated embodiment, the second bottom portion 335 and the second back portion 345 are made of wood. Optionally, a seat cover (not illustrated) is coupled to the second bottom portion 335 and the second back portion 345 by staples, tacks, or other suitable fasteners.

Figure 12:
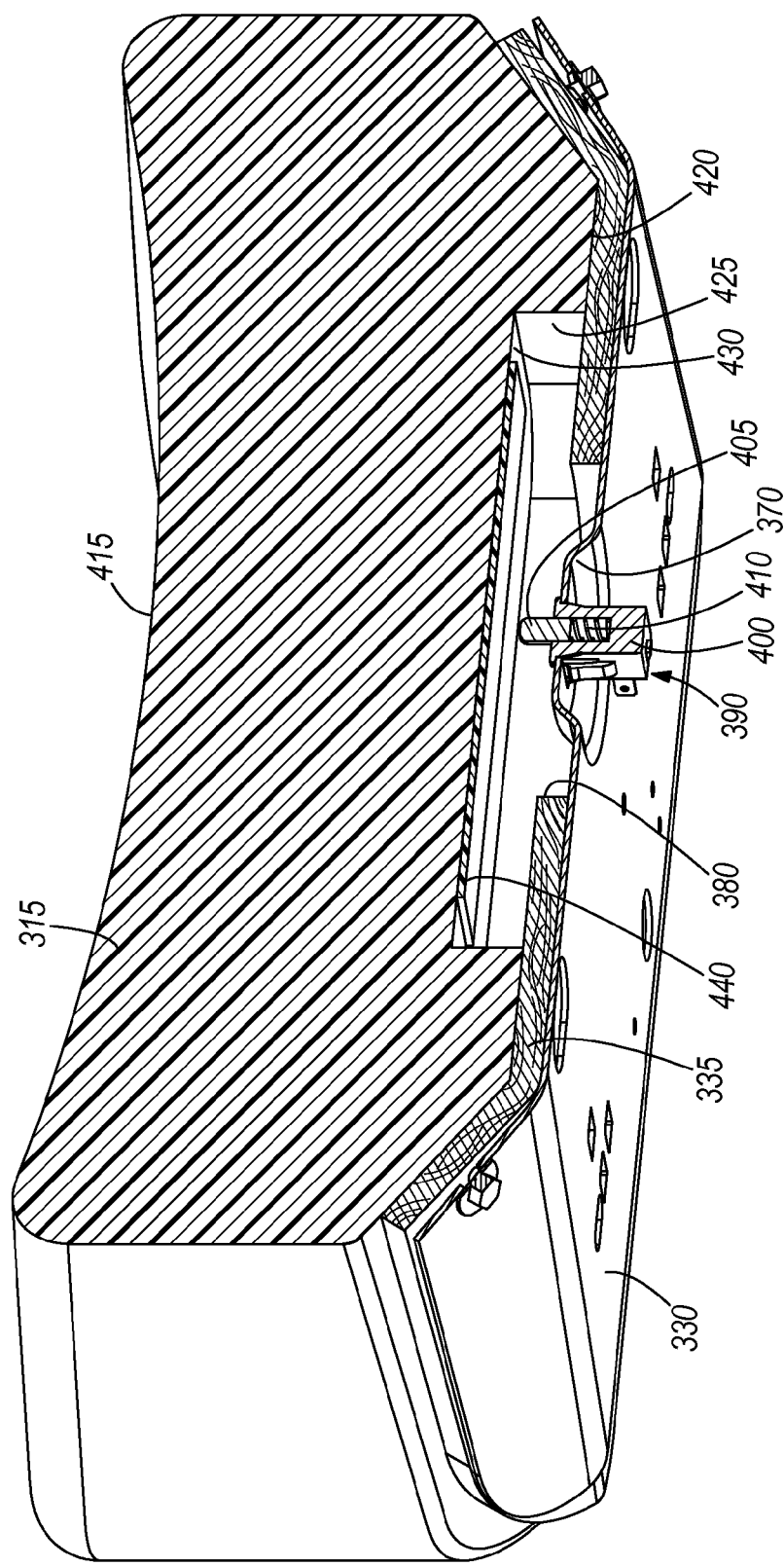
FIG. 12 is a cross-section view taken along line 12-12 of FIG. 9 showing the seat in an at-rest condition.

As shown in FIGS. 10-12, the first bottom portion 330 includes an upwardly extending protrusion 370 defining an aperture 375 therein. In the illustrated embodiment, the protrusion 370 and aperture 375 are substantially centrally located, but other locations are possible. The second bottom portion 335 defines an aperture 380 that is sized to receive at least a portion of the protrusion 370 therein.

A switch 390 is mounted to the aperture 375 of the first bottom portion 330 and is positioned in the aperture 380 of the second bottom portion 335. The switch 390 includes at least one tab that creates a snap fit to retain the switch 390 within the aperture 375. In another embodiment, the switch 390 is mounted to the aperture 380 of the second bottom portion 335. The switch 390 includes a first portion 400, a second portion 405, moveable with respect to the first portion 400 and a biasing member 410, such as the illustrated spring. The first portion 400 is mounted to the first bottom portion 330 and the second portion 405 is moveable with respect to the first bottom portion 330 to actuate the switch 390.

The bottom cushion 315 has an upper surface 415 configured to support a user and a lower surface 420 opposite the upper surface 415. The lower surface 420 defines a cavity 425 which defines a recessed portion 430 of the lower surface 420. A switch actuator 440 is coupled to the bottom cushion 315 in the cavity 425, specifically the recessed portion 430 of the lower surface 420. The illustrated switch actuator 440 is a substantially rectangular plate, but other shapes are possible. The switch actuator 440 is made of a flexible and resilient material, such as a high density polyethylene, a piece of re-bond foam, or other material. The switch actuator 440 can be coupled to the recessed portion 430 of the bottom cushion 315 by any suitable fastener or method. The illustrated switch actuator 440 is coupled to the bottom cushion 315 by adhesive. In some embodiments, the switch actuator 440 is molded into the bottom cushion 315, either exposed on the lower surface of the cushion or with a thin layer of foam covering the switch actuator 44, during manufacturing. For purposes of the specification and the appended claims, the switch actuator 44 is said to be "mounted to the lower surface" whether the switch actuator 44 is exposed or covered by a thin layer of foam, as long as the switch actuator 44 can actuate the switch when the seat 300 is in the deflected condition. In the illustrated embodiment, the switch actuator 440 is mounted to lower surface 420 of the bottom cushion 315 in a substantially central location. Other positions of the switch actuator 440 and the cavity 425 on the bottom cushion 315 are possible; the invention is not limited to the specific illustrated embodiment.

Figure 13:
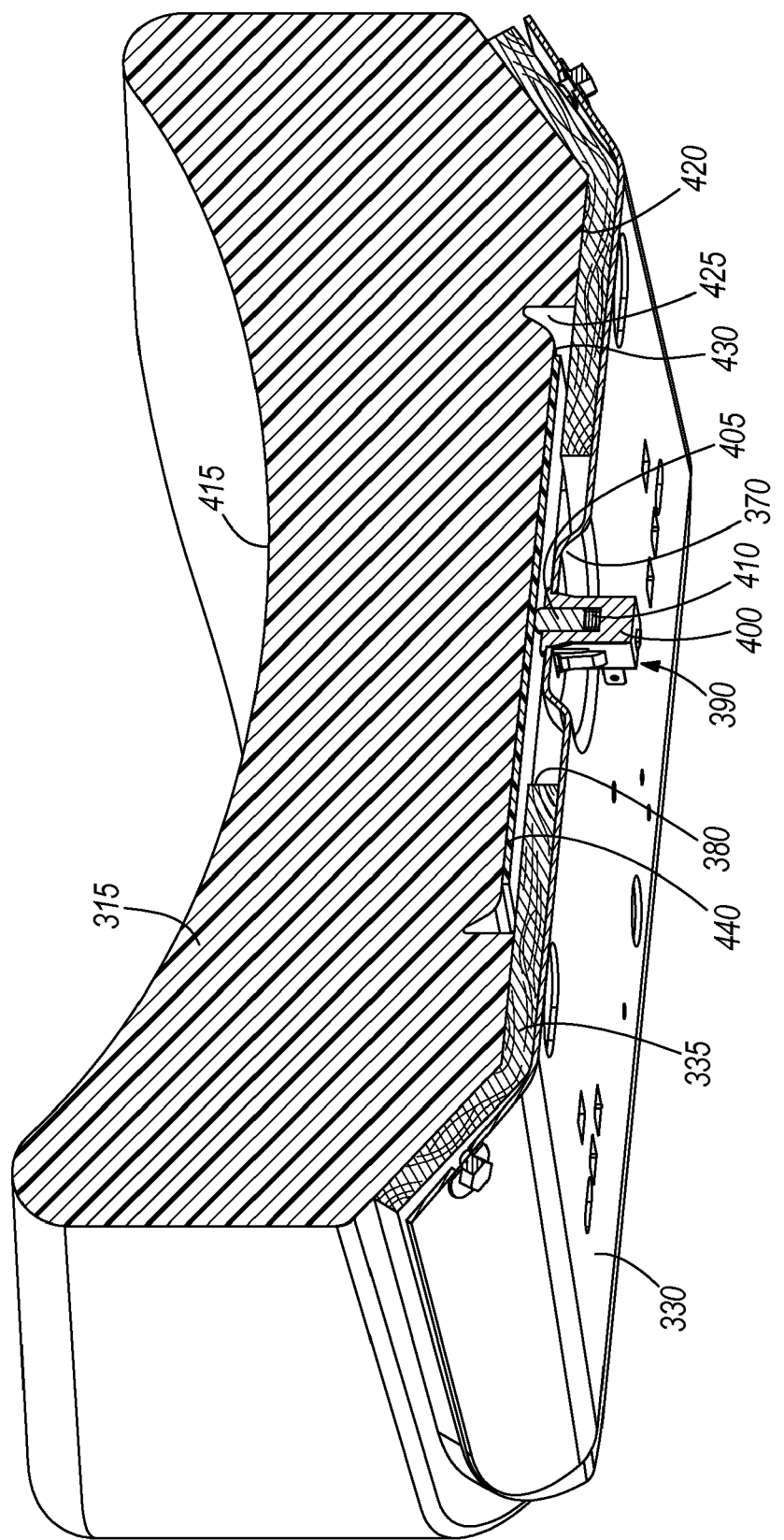
FIG. 13 is the same view as FIG. 12 but showing the seat in a bottomed-out deflected condition.
Figure 14:
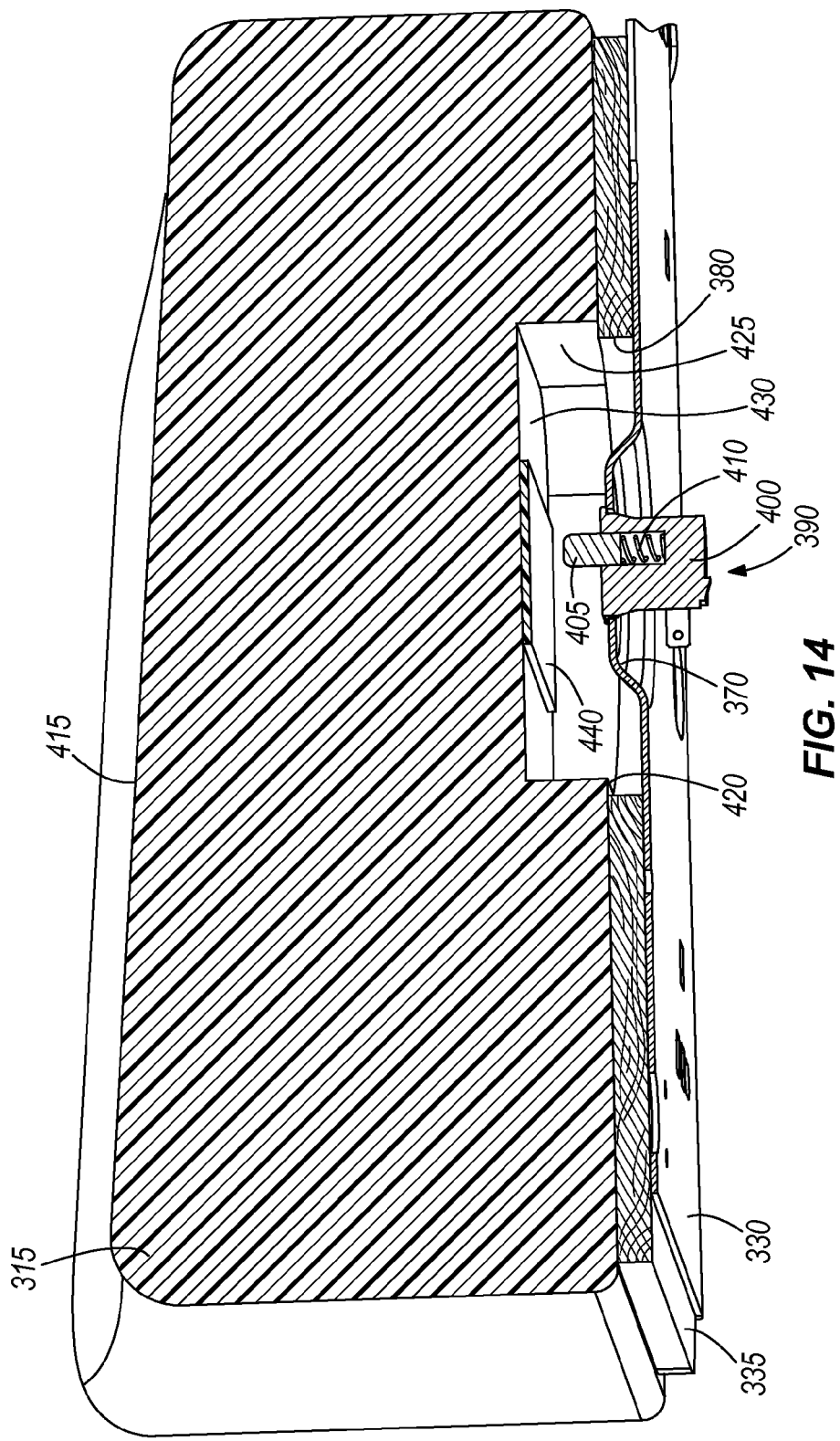
FIG. 14 is a cross-section view taken along line 14-14 of FIG. 9 showing the seat in an at-rest condition.

When the seat 300 is in an at rest condition, as shown in FIGS. 12 and 14, the switch actuator 440 is in a non-actuating position; when the seat 300 is in a deflected condition, as shown in FIGS. 13 and 15, the switch actuator 440 is in an actuating position. When the seat 300 is in the at rest condition, the switch actuator 440 is over the second portion 405 of the switch 390. The switch actuator 440 may be spaced from the second portion 405 (as illustrated in FIGS. 12 and 14) or contact the second portion 405, provided there is insufficient force applied to the second portion 405 to actuate the switch 390 due to the switch actuator 440 resting on the second portion 405.

FIGS. 13 and 15 illustrate the seat 300 in the deflected condition, due to the presence of an operation upon the seat 300. The bottom cushion 315 deflects, which moves the switch actuator 440 downward toward the switch 390. The switch actuator 440 presses against the second portion 405 of the switch 390 to depress the second portion 405 of the switch 390 against the biasing force of the spring 410. When the seat is in the deflected condition and the switch actuator 440 is in the actuating position, the ignition system 45 is permitted to operate.

When the operator gets out of the seat 300, the bottom cushion 315 returns to the at rest condition, such that the spring 410 is permitted to bias the second portion 405 of the switch 390 away from the first portion 400. This inhibits and/or prevents the ignition system 45 from operating. In another embodiment, the switch 390 is flipped around, such that the switch actuator 440 press against the first portion 400 of the switch 390.

Although the illustrated embodiment described above contemplates use of a normally open switch, it could in other embodiments include a normally closed switch that connects the ignition system 45 to a grounding circuit when the switch actuator 210, 440 moves to the non-actuated position. Although the illustrated embodiment described above controls the ignition system 45, other embodiments may apply the invention to other types of systems, including but not limited to airbag deployment, transmission interlocks, and implement power take off.

Thus, the invention provides, among other things, a switch actuator for a vehicle seat. Various features and advantages of the invention are set forth in the following claims.

What is claimed is:

1. A seat comprising:
 a seat frame;
 a seat cushion supported by the seat frame, the seat cushion having an upper surface configured to support a user and a lower surface, opposite the upper surface, the lower surface defining a cavity, the seat cushion moveable between an at rest condition in which no operator is seated on the seat, and a deflected condition in which the seat cushion is deflected with respect to the frame in response to an operator seated on the seat;
 a switch mounted to the frame, the switch having first and second parts movable with respect to each other to open and close an electrical circuit in response to an actuating force;
 a switch actuator mounted to the seat cushion lower surface in the cavity and movable between a non-actuating position when the seat is in the at rest condition and an actuating position when the seat is in the deflected condition, the switch actuator delivering the actuating force as the switch actuator is moved toward the actuating position; and
 a resilient web supported by the seat frame, the web positioned between the switch and the switch actuator, the resilient web supporting the seat cushion,
 wherein the switch actuator delivers the actuating force to the switch through the resilient web.

2. The seat of claim 1, wherein the first part of the switch is mounted to the frame and the actuating force moves the second part with respect to the first part.

3. The seat of claim 1, wherein the switch actuator is substantially centrally located on the seat cushion lower surface.

4. The seat of claim 1, wherein the switch is adapted for use with an ignition system of an off-highway vehicle, and the switch disables the ignition system in response to the switch actuator moving into the non-actuating position.

5. The seat of claim 4, wherein the switch includes a biasing member biasing the first and second parts away from each other, and wherein the actuating force includes a compressive force that deflects the biasing member.

6. The seat of claim 1, wherein the switch actuator is made of high density polyethylene.

7. The seat of claim 1, further comprising an adhesive mounting the switch actuator to the seat cushion.

8. The seat of claim 1, further comprising a second frame member positioned between the seat cushion and the seat frame, the second frame member defining an aperture through which the switch extends to permit actuation of the switch by the switch actuator in response to the actuating force.

9. An off-highway vehicle comprising:
a chassis;
a wheel supporting the chassis;
a prime mover mounted to the chassis;
a transmission for driving the wheel in response to the operation of the prime mover;
a seat frame;
a seat cushion supported by the seat frame, the seat cushion having an upper surface configured to support a user and a lower surface, opposite the upper surface, the lower surface defining a cavity, the seat cushion moveable between an at rest condition in which no operator is seated on the seat, and a deflected condition in which the seat cushion is deflected with respect to the frame in response to an operator seated on the seat;
a switch mounted to the frame, the switch having first and second parts movable with respect to each other to open and close an electrical circuit in response to an actuating force;
a switch actuator mounted to the seat cushion lower surface in the cavity and movable between a non-actuating position when the seat is in the at rest condition and an actuating position when the seat is in the deflected condition, the switch actuator delivering the actuating force as the switch actuator is moved toward the actuating position; and
a resilient web supported by the seat frame, the web positioned between the switch and the switch actuator, the resilient web supporting the seat cushion,
wherein the switch actuator delivers the actuating force to the switch through the resilient web.

10. The off-highway vehicle of claim 9, wherein the first part of the switch is mounted to the frame and the actuating force moves the second part with respect to the first part.

11. The off-highway vehicle of claim 9, wherein the prime mover includes an internal combustion member; wherein the electrical circuit includes an ignition circuit enabling operation of the engine when closed and disabling operation of the engine when open; and wherein the switch opens the ignition circuit in response to the switch actuator moving into the non-actuating position and closes the ignition circuit in response to the switch actuator moving into the actuating position.

12. The off-highway vehicle of claim 9, wherein the switch actuator is substantially centrally located on the seat cushion lower surface.

13. The off-highway vehicle of claim 9, wherein the switch actuator comprises high density polyethylene.

14. The off-highway vehicle of claim 9, further comprising an adhesive mounting the switch actuator to the seat cushion.

15. The off-highway vehicle of claim 9, further comprising a second frame member positioned between the seat cushion and the seat frame, the second frame member defining an aperture through which the switch extends to permit actuation of the switch by the switch actuator in response to the actuating force.

16. The off-highway vehicle of claim 9, wherein the second part of the switch extends into the cavity.

17. A seat comprising:
a seat frame;
a seat cushion supported by the seat frame, the seat cushion having an upper surface configured to support a user and a lower surface, opposite the upper surface, the lower surface defining a cavity, the seat cushion moveable between an at rest condition in which no operator is seated on the seat, and a deflected condition in which the seat cushion is deflected with respect to the frame in response to an operator seated on the seat;
a switch mounted to the frame, the switch having first and second parts movable with respect to each other to open and close an electrical circuit in response to an actuating force;
a switch actuator mounted to the seat cushion lower surface in the cavity and movable between a non-actuating position when the seat is in the at rest condition and an actuating position when the seat is in the deflected condition, the switch actuator delivering the actuating force as the switch actuator is moved toward the actuating position; and
a rib on the seat cushion lower surface, the rib extending around substantially an entire perimeter of the switch actuator.

18. The seat of claim 17, further comprising a resilient web supported by the seat frame, the web positioned between the switch and the switch actuator, the resilient web supporting the seat cushion; wherein the switch actuator delivers the actuating force to the switch through the resilient web.

19. An off-highway vehicle comprising:
a chassis;
a wheel supporting the chassis;
a prime mover mounted to the chassis;
a transmission for driving the wheel in response to the operation of the prime mover;
a seat frame;
a seat cushion supported by the seat frame, the seat cushion having an upper surface configured to support a user and a lower surface, opposite the upper surface, the lower surface defining a cavity, the seat cushion moveable between an at rest condition in which no operator is seated on the seat, and a deflected condition in which the seat cushion is deflected with respect to the frame in response to an operator seated on the seat;
a switch mounted to the frame, the switch having first and second parts movable with respect to each other to open and close an electrical circuit in response to an actuating force;
a switch actuator mounted to the seat cushion lower surface in the cavity and movable between a non-actuating position when the seat is in the at rest condition and an actuating position when the seat is in the deflected condition, the switch actuator delivering the actuating force as the switch actuator is moved toward the actuating position; and a rib on the seat cushion lower surface, the rib extending around substantially an entire perimeter of the switch actuator.

20. The off-highway vehicle of claim 19, further comprising a resilient web supported by the seat frame, the web positioned between the switch and the switch actuator, the resilient web supporting the seat cushion; wherein the switch actuator delivers the actuating force to the switch through the resilient web.

* * * * *